United States Patent [19]
Maxwell

[11] Patent Number: 5,711,785
[45] Date of Patent: Jan. 27, 1998

[54] METHOD AND APPARATUS FOR CONTROLLING THE CLEANING CYCLE OF AIR FILTER ELEMENTS AND FOR PREDICTING THE USEFUL LIFE THEREOF

[75] Inventor: Allan L. Maxwell, Sistersville, W. Va.

[73] Assignee: Ormet Corporation, Wheeling, W. Va.

[21] Appl. No.: 548,443

[22] Filed: Oct. 26, 1995

[51] Int. Cl.$^6$ .................................................. B01D 46/04
[52] U.S. Cl. ........................... 95/15; 55/272; 55/274; 55/283; 55/302; 55/DIG. 34; 95/20; 95/25; 95/26; 95/280
[58] Field of Search .................................. 95/14, 15, 20, 95/25, 26, 279, 280; 55/270, 271, 272, 274, 283, 302, DIG. 34

[56] References Cited

U.S. PATENT DOCUMENTS

| | | | |
|---|---|---|---|
| 4,277,255 | 7/1981 | Apelgren | 55/270 |
| 4,433,986 | 2/1984 | Borst | 55/283 |
| 4,464,184 | 8/1984 | Cera et al. | 55/270 |
| 4,500,326 | 2/1985 | Sunter | 95/20 |
| 4,507,130 | 3/1985 | Roth | 95/279 |
| 4,521,226 | 6/1985 | Alig et al. | 95/22 |
| 4,786,293 | 11/1988 | Labadie | 95/20 |
| 4,786,295 | 11/1988 | Newman et al. | 55/213 |
| 4,865,627 | 9/1989 | Dewitz et al. | 55/270 |
| 4,881,176 | 11/1989 | Kononov | 364/500 |
| 4,999,032 | 3/1991 | Wright | 95/286 |
| 5,084,659 | 1/1992 | Hayashi et al. | 318/558 |
| 5,094,675 | 3/1992 | Pitt et al. | 95/280 |
| 5,105,619 | 4/1992 | Arai | 60/286 |
| 5,116,395 | 5/1992 | Williams | 55/273 |
| 5,205,156 | 4/1993 | Asano et al. | 73/38 |
| 5,236,477 | 8/1993 | Koketsu | 55/274 |
| 5,334,237 | 8/1994 | Lorimer | 95/25 |
| 5,338,326 | 8/1994 | Jelich et al. | 55/213 |
| 5,346,533 | 9/1994 | Jelich et al. | 95/20 |
| 5,348,572 | 9/1994 | Jelich et al. | 55/270 |
| 5,378,254 | 1/1995 | Maly et al. | 55/271 |
| 5,391,218 | 2/1995 | Jorgenson et al. | 95/20 |
| 5,484,536 | 1/1996 | Yamaguchi et al. | 95/15 |

FOREIGN PATENT DOCUMENTS

| | | | |
|---|---|---|---|
| 2606146 | 8/1977 | Germany | 95/279 |
| 3336487 | 4/1985 | Germany | 55/283 |
| 54-153384 | 12/1979 | Japan | 55/283 |
| 60-75317 | 4/1985 | Japan | 55/272 |
| 62-186919 | 8/1987 | Japan | 55/283 |
| 2-139015 | 5/1990 | Japan | 55/283 |
| 3-229607 | 10/1991 | Japan | 95/20 |
| 5-49828 | 3/1993 | Japan | 95/280 |
| 5-115727 | 5/1993 | Japan | 95/20 |
| 6-7619 | 1/1994 | Japan | 55/283 |

*Primary Examiner*—Duane S. Smith
*Attorney, Agent, or Firm*—Webb Ziesenheim Bruening Logsdon Orkin & Hanson, P.C.

[57] ABSTRACT

A method and apparatus are disclosed for cleaning filter elements, such as filter bags in a plurality of baghouses and for predicting the useful life of such filter elements in individual baghouses. The volumetric flow rate of air from each baghouse is continually calculated using actual impact and static pressure measurements and compared with a flow rate set point. The set point is continually adjusted for density correction based on the actual air stream temperature. The bags are pulsed for cleaning when the flow rate is less than the adjusted set point. Pulsing is then halted when the flow rate reaches or exceeds the adjusted set point. Total daily cleaning times are accumulated over time and graphically displayed to indicate when a critical level is reached indicating that filter bag change out is needed. Each baghouse is monitored in this manner to reflect the unique operating conditions of each baghouse.

15 Claims, 8 Drawing Sheets

METHOD AND APPARATUS FOR CONTROLLING THE CLEANING CYCLE OF AIR FILTER ELEMENTS AND FOR PREDICTING THE USEFUL LIFE THEREOF

BACKGROUND OF THE INVENTION

The present invention relates generally to air filtration and, more particularly, to apparatus and methods for controlling the cleaning of industrial air filters, such as for example, fabric bag filters. In addition, the invention relates to apparatus and methods for predicting the life of such filters. Industrial filter systems of this type are commonly used for the purpose of air pollution control in the treatment of waste gas streams.

It is common to mount a plurality of fabric filters in a structure known in the art as a baghouse or module. Each baghouse may contain hundreds of individual fabric filter bags. Typically, more than one baghouse is used and it is common to connect the plurality of baghouses in a parallel ducting arrangement relative to the gas stream. Dust laden gas is forced to flow through each baghouse by either a forced draft or an induced draft fan depending upon whether the fans are located upstream or downstream of the baghouses.

It is also well-known to employ self-cleaning air filters of the pulsed air type or of the mechanical shaker or rapper types to periodically remove accumulated dust cake from the fabric filter bags. If the filter elements are not properly cleaned, they become blinded or clogged prematurely, resulting in expensive maintenance and replacement costs.

Heretofore, it has been common practice to employ a timer or, more typically, to use a pressure drop measurement across the baghouse to initiate a bag cleaning cycle. When a cleaning cycle is initiated, a reverse pulse of air or a mechanically induced vibration (depending upon the type of cleaning system) causes the filter bag to sharply move in order to knock the accumulated dust cake therefrom. Such devices and control techniques in themselves are well-known in the art. Exemplary of this prior art is U.S. Pat. No. 4,786,293 to Labadie and U.S. Pat. No. 4,507,130 to Roth.

A timer system using a fixed time interval to initiate and carry out the cleaning cycle may be suitable in cases where the rate of particulate accumulation is constant and sufficiently predictable. Unfortunately, in most industrial situations, dust loading is not constant in the gas stream being emitted from the source or in the gas streams entering the individual baghouses communicating with the source. Thus, on one hand, a timer based cleaning system may cycle unnecessarily and clean filter elements which, in fact, are relatively clean. Such needless cleaning may contribute to shorten the life of the individual filter bags. On the other hand, if the dust loading in the system becomes extremely heavy for a period of time, a fixed timer device fails to accommodate such circumstances and premature blockage or blinding of the filters oftentimes result.

In the case of pressure drop systems, it is known that the pressure drop across a baghouse increases as the filter elements become more dust laden. Pressure drop across the baghouse is monitored, either automatically or by an operator and each baghouse cleaning cycle is initiated or adjusted when the pressure drop reaches a threshold set point. In a manual system, an operator typically adjusts the pulse timer at a predetermined high or low set point. In a conventional multiple baghouse system, all baghouses are ducted parallel to each other. Thus, although pressure sensors may be located at individual baghouses, the pressure sensors necessarily respond to a pressure drop in the total system and the baghouse cleaning cycles are all triggered at approximately the same time as a threshold set point is reached.

It has heretofore been assumed in the art that the differential pressure across the baghouse could be used to accurately determine when a pulse cleaning cycle should be triggered and also to predict bag blinding (for the purpose of bag replacement). When the differential pressure level can no longer be reduced by increasing the cleaning pulse rate, it has been common practice to replace the bags. In actual practice, I have determined that this higher pressure differential is non-existent in a multiple baghouse system. In a multiple baghouse system containing 24 baghouses or modules, for example, connected in parallel and with fans on the discharge side, an induced draft pulls gas through each module. The pressure drop across each module is the same as the total system pressure drop, comparable to a parallel resistor network. Thus, in such a 24 module system, a completely blinded module or baghouse containing, for example, 352 fabric bag filters, would result in about only a 4% increase in flow through the remaining 23 baghouses. A single normal cleaning pulse on a module will increase the flow through the module by more than this 4%.

It has also been commonly believed that all of the individual baghouses or modules in a multiple baghouse system receive more or less the same dust loading and, therefore, would experience the same bag life. It has, therefore, become common practice to assume a fixed bag life for all baghouses of, for example, two years. In such a scheme, the filter bags in each of the baghouses are replaced on a staggered basis, for example, at six-month intervals, when the two-year life has been reached. In actual practice, I have determined, however, that individual baghouses within a multiple array receive different dust loading and therefore experience different life expectancies for the respective filter elements in each. The employment of a conventional pulsed cleaning system based on a fixed time interval or based on a differential pressure measurement also fails to recognize the fact that in parallel ducted systems, individual baghouses in the multiple array receive different dust loading and may require more or less frequent cleaning in order to keep the bags clean and in order to extend the bag life to a term substantially in excess of two years. Due to the non-recognition of these factors in the prior art, bag life has not been optimized.

The present invention solves the problem heretofore associated with cleaning bag filters in multiple baghouse systems as well as in predicting the useful life of the bags in individual baghouses.

The present invention recognizes that the measurement of a differential pressure across each module or baghouse is relatively meaningless as to the condition of individual baghouses in a parallel ducted system. Accordingly, the present invention monitors the condition of each baghouse or module by continuously measuring the actual gas flow through each module as opposed to the prior art technique of measuring differential pressure across the module.

The present invention provides a method and apparatus which continuously measures gas flow through each baghouse or module and uses this data and other measurements, as described in greater detail below, to clean only those modules which actually require cleaning. The present invention further provides a method and apparatus for accumulating and plotting the daily cleaning time for each module over months of operation to accurately predict the filter bag life end point in each module.

In addition, the method and apparatus of the present invention also measures gas stream temperatures to allow for density correction to provide more accurate gas flow data. In this manner, maximum air flow is maintained through the system. In addition, the need for manual damper control for adjusting fan amperes and the problem of fan motor overloading are eliminated.

SUMMARY OF THE INVENTION

The present invention is directed to a method and apparatus for controlling the cleaning cycle of air filter elements such as the filter bags in a plurality of baghouses or modules. The invention is also directed to a method for predicting the life of the filter elements in individual baghouses. Briefly stated, a method according to the present invention includes the steps of: (a) monitoring actual air flow velocity from an exit duct of a baghouse; (b) comparing the actual flow rate with a previously established set point flow rate; (c) continually adjusting the set point for temperature based density correction of the air stream; (d) activating the cleaning cycle of the baghouse when the monitored actual flow rate falls below the previously established set point; (e) deactivating the cleaning cycle when the actual flow rate is above the set point; (f) accumulating the total time the baghouse is in the cleaning cycle each day; (g) graphically displaying the accumulated cleaning time per day over calendar time; and (h) predicting the need for a change out of filter bags in a baghouse when the graphically displayed cleaning time for the baghouse begins to exhibit a sharp upward slope.

The actual volumetric flow rate of the air stream from the baghouse is computed periodically, for example, every second, by measuring the velocity pressure of the air stream exiting therefrom. The velocity pressure is the difference between the total or impact pressure and the static pressure of the airstream in the duct exiting the baghouse. The corrected set point value is also calculated to account for density changes in the air stream by continuously measuring the actual gas stream temperature. This density adjusted value is used to establish a new set point against which the actual volumetric flow rate is compared. A computer then controls the cleaning of the filter bags to maintain the new, density adjusted set point.

In a dust collection system comprising a plurality of baghouses or modules according to the method of the present invention, the actual volumetric flow rate of filtered air from each baghouse is monitored. If the air flow from a particular baghouse falls below the temperature/density corrected set point, a timer is activated to pulse the bags in that particular baghouse. Once the flow of air for the particular baghouse returns to a level above the set point, the pulsing timer is turned off. The total time each baghouse in the system has been pulsed is accumulated on a daily basis for each baghouse. A graph is then generated showing average daily pulse time versus calendar time for each of the individual baghouses. A typical baghouse will generate a linear graph, the slope of which is generally constant over many months of operation until a time is reached when repeated cleaning fails to bring the daily accumulated cleaning time to the previously graphed level. When this abrupt "knee" or vertical slope adjustment in the graph occurs, it is an indication that the baghouse is becoming blinded with particulate material. At that point, the graph indicates to the operator that the individual filter bags in the particular baghouse in question should be replaced.

An apparatus for automatically pulsing the filter bags of a baghouse or a plurality of baghouse modules according to the present invention includes air flow detection means for monitoring the actual air flow through each baghouse module. The air flow detection means is preferably placed in the discharge duct of each of the baghouse modules and includes an averaging dual tube Pitot tube for measuring a velocity pressure of the air stream exiting the module and a transmitter for sending this data to a computer. The computer receives the velocity pressure and static pressure data and calculates once every second the actual volumetric flow rate of the air stream in the discharge duct (of known cross sectional area) in cubic feet per minute. By comparing the actual volumetric flow rate against a set point, the computer will then send a signal to a pulse timer which, in turn, activates a plurality of solenoids to pulse the bags for a given time period when the actual flow rate is below the set point. A thermocouple continuously measures the temperature of the air passing through the system, which is in turn continuously monitored by the computer. The actual air temperature is then used to calculate a density factor for the air to continually adjust and correct the set point as the temperature rises or falls in order to maintain a maximized, consistent flow of air through the system and to keep the fan motor current draw at a consistent level. This results in a consistent load on the fans at all temperatures and maximizes the efficiency of the fans. The temperature/air density correction feature of the invention eliminates the need for manual adjustment of the fan dampers which heretofore has been required to prevent fan motor overloading. In this manner, maximum air evacuation in the system is maintained.

DETAILED DESCRIPTION OF THE INVENTION

The invention will now be described in connection with a dry scrubber system of a conventional type which includes a plurality of baghouses or modules. Each module contains many individual fabric bag filters which are periodically cleaned by a burst of high pressure air. Of course it will be understood that the present invention is also suitable for use with other cleaning systems, for example, those which employ mechanical shakers or rappers to shake or vibrate the bags in order to dislodge the collected particulate dust cake therefrom.

In the system to be described, the filter bags hang on venturi nozzles. Periodic cleaning is initiated by a burst of high pressure air through a hole in an air line directly over the venturi. The burst of high pressure air is of short duration, on the order of about 0.1 second. As the high pressure air travels through the venturi, it draws with it a large volume of air which causes a shock wave to travel up and down the filter bag which causes the collected particulate material to become dislodged and fall by gravity from the bag, all in a well-known manner.

The present invention as described herein was tested in a dry scrubber system using a plurality of baghouses. Each baghouse module in this dry scrubber system contains 352 individual bag filters. A total of 24 baghouse modules service one reactor which generates a waste gas stream in the reduction of alumina in the production of aluminum metal. The major pollutant from an aluminum reduction cell is fluoride gas. Virgin, particulate alumina material is used in the dry scrubber system to adsorb the fluoride in the waste gas stream emitted from the reduction process. This fluoride enriched alumina is recovered in the dry scrubber system and then used in the reduction process to produce aluminum metal. Aluminum fluoride is one of the chemicals that is added to the reduction cells when producing aluminum. Therefore, the efficient capture and return of the fluoride to the reduction cells results in a savings in the overall process.

Figure 1:
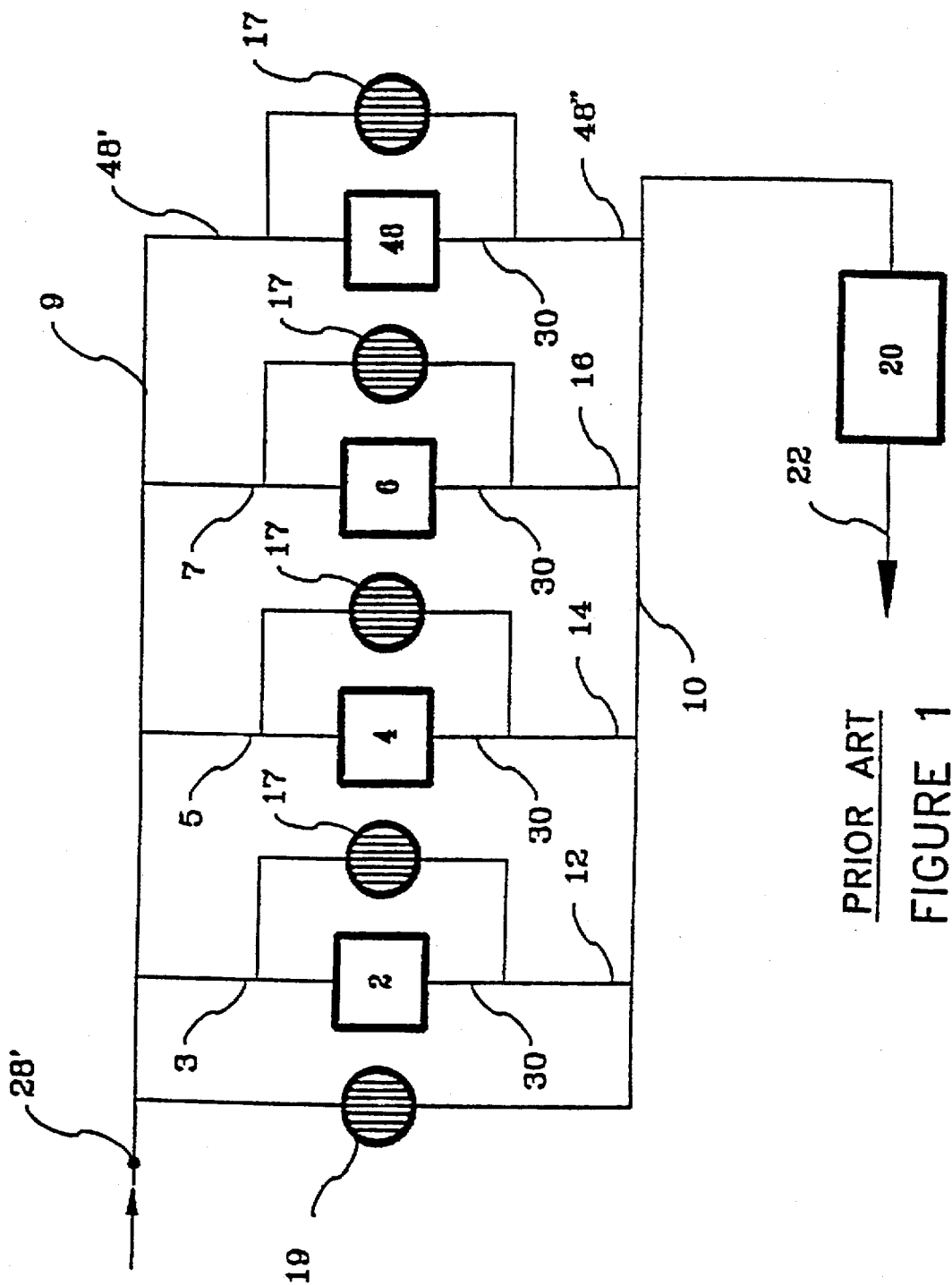
FIG. 1 is a schematic of an array of baghouses utilizing a parallel ducting arrangement and a pressure measuring system according to the prior art.

In the example schematically illustrated in FIG. 1, a plurality of identical baghouses or modules 2, 4, 6 . . . 48 are connected by a conventional parallel ducting arrangement between common inlet and outlet ducts 9 and 10, respectively. The twenty-four baghouses are connected in parallel in the actual system tested and service a conventional aluminum pot line reactor (not shown). Of course, the invention is suitable for use in connection with air cleaning systems employing baghouses or modules less than or more than the twenty-four baghouses of the present example. The dust laden air from the reduction process (or other source) is delivered to the baghouses 2, 4, 6 . . . 48 by the main or common inlet duct 9. Individual inlet ducts 3, 5, 7 . . . 48' communicate with the common duct 9 and the respective baghouses 2, 4, 6 to 48 to permit the dust laden air to enter the baghouses for filtration. Likewise, individual outlet ducts 12, 14, 16 through 48" deliver the clean air to the main or common outlet duct 10. High horsepower, motor-driven fans 20 communicate with the main outlet duct 10 to induce a draft of air through the total system, that is, from the reduction process, through the respective baghouses to the outlet duct. The clean air is then discharged to the atmosphere at a discharge outlet 22 downstream from the fans 20. The above-described ducting arrangement and induced draft air flow are in themselves all well-known in the art and conventional in baghouse systems.

In the use of this known air cleaning system and in similar prior art systems employing a plurality of baghouses, it has been assumed that the differential pressure across each baghouse was an important data point in determining the condition of the filter bags and whether pulse cleaning or outright replacement was called for. Heretofore, it has been conventional practice to measure the pressure drop across a baghouse by use of a manometer or known pressure transducer 17 in order to determine when cleaning or pulsing of the bags is required and to predict the onset of bag saturation or blinding. When the pressure differential across a baghouse can no longer be reduced by increasing the pulse rate, it has heretofore been assumed that the bags were blinded and required replacement.

In actual practice, this perceived higher pressure differential is non-existent. For example, in a system employing 24 modules as depicted in the parallel ducted arrangement of FIG. 1, the system is comparable to a parallel resistor network. That is to say, the pressure drop across each baghouse 2, 4, 6, 8 . . . 48 is equal to the total pressure drop across the entire system, as would be measured by a pressure sensor 19 which senses the ΔP across the main inlet and outlet ducts 9 and 10, respectively. Thus, in a parallel ducted system, as in FIG. 1, the pressure drop across a given baghouse is not indicative of the true condition of that baghouse module. For example, a completely blinded module in a 24 module system would result in about only a 4% increase in flow throughout the remaining modules. Conversely, a single normal cleaning pulse on a module will increase the flow through that cleaned module by more than this 4%.

In the apparatus and method according to the present invention, an averaging double tube, Pitot tube 30, for measuring impact pressure and static pressure is positioned within each of the outlet ducts 12, 14, 16 . . . 48" for each baghouse. A measurement device 30 suitable in the practice of the invention is sold by MidWest Instrument, Delta Tube Model No. 306 AT-11-AO. As seen in the enlarged view of FIG. 2, the averaging dual Pitot tube 30, is shown mounted within the discharge duct 12 of the baghouse module 2. The averaging dual Pitot tube 30 consists of two concentric tubes, one measures the total pressure or impact pressure existing in the flowing air stream, the other measures the static pressure only. The location of the averaging Pitot tube within the outlet duct is important. The tube must be located perpendicular to the air flow and should be located as much as possible in a straight section of duct away from turbulence causing elbows, projections, and the like. The adherence to the above locations is very important if absolute flow rates are to be obtained. The averaging Pitot tube 30 has a plurality of holes positioned along its length which averages the pressure and tends to smooth out the effect of turbulence within the duct.

In the present invention, the attainment of absolute flow values for comparing one baghouse versus another, while desirable, is not critical to the operation. Consistency or repeatability of the readings for an individual baghouse is more important. Plus or minus a few hundred CFM in an individual baghouse is insignificant.

The difference between the total or impact pressure (sometimes referred to in the art also as "flow pressure") and the static pressure measurement provides the velocity pressure of the gas stream existing within the discharge duct 12. The impact pressure and static pressure data is fed by a data transmission line 32 to a differential pressure transmitter device 34. A suitable differential pressure transmitter device 34, by way of example, is manufactured and sold by Dwyer Instruments, Model 607.

Differential pressure data is transmitted between the transmitter 34 and a computer interface 36 by a network segment 35 and between the interface 36 and a computer 40 by a network segment 38. The computer interface 36 may be, for example, a Solartron "IMPS" 35951C Analog, and 35952A Digital I/O using 35954A Adapter Cards supplied by Solartron Instruments, Farnborough, Hampshire GU14 7PW England. The remaining hardware, namely the computer 40, may be, for example, supplied by Texas Microsystems, Model 486-50, Industrialized, Super VGA Monitor, rack mounted. The software may be Microsoft DOS 6.2, Microsoft Windows 3.1, and RTM 35032, supplied by Micro Speciality Systems, Inc. of Northhampton, Pa.

By continuously measuring the impact or total pressure and static pressure by virtue of the double tube averaging Pitot tube 30, the computer 40 calculates the actual volumetric flow rate of air in the discharge duct 12. This calculation is preferably made at one second intervals.

The actual velocity of an air stream is calculated by use of the following known equation (1):

$$V = C \sqrt{\frac{VP}{0.75d}} \quad (1)$$

where air is at standard conditions (d=1.0), equation (1) becomes:

$$V = 4005 \sqrt{(VP)} \quad (2)$$

Hence, VP in equation (2) becomes:

$$V = 4005 \sqrt{(IP - SP)} \quad (3)$$

In order to calculate an actual volumetric flow rate (VFR), the cross sectional area ("A") of duct 12 is determined and inserted in equation (3) to obtain:

$$VFR = 4005 \sqrt{(IP - SP)} \cdot A \quad (4)$$

where:

A of duct 12=4.9 sq. ft. (from actual duct measurement)

This yields a final equation (5) below which provides an actual volumetric flow rate (VFR) in cubic feet per second of air exiting the baghouse module 2:

$$VFR = 19659 \sqrt{(IP - SP)} \quad (5)$$

Figure 2:
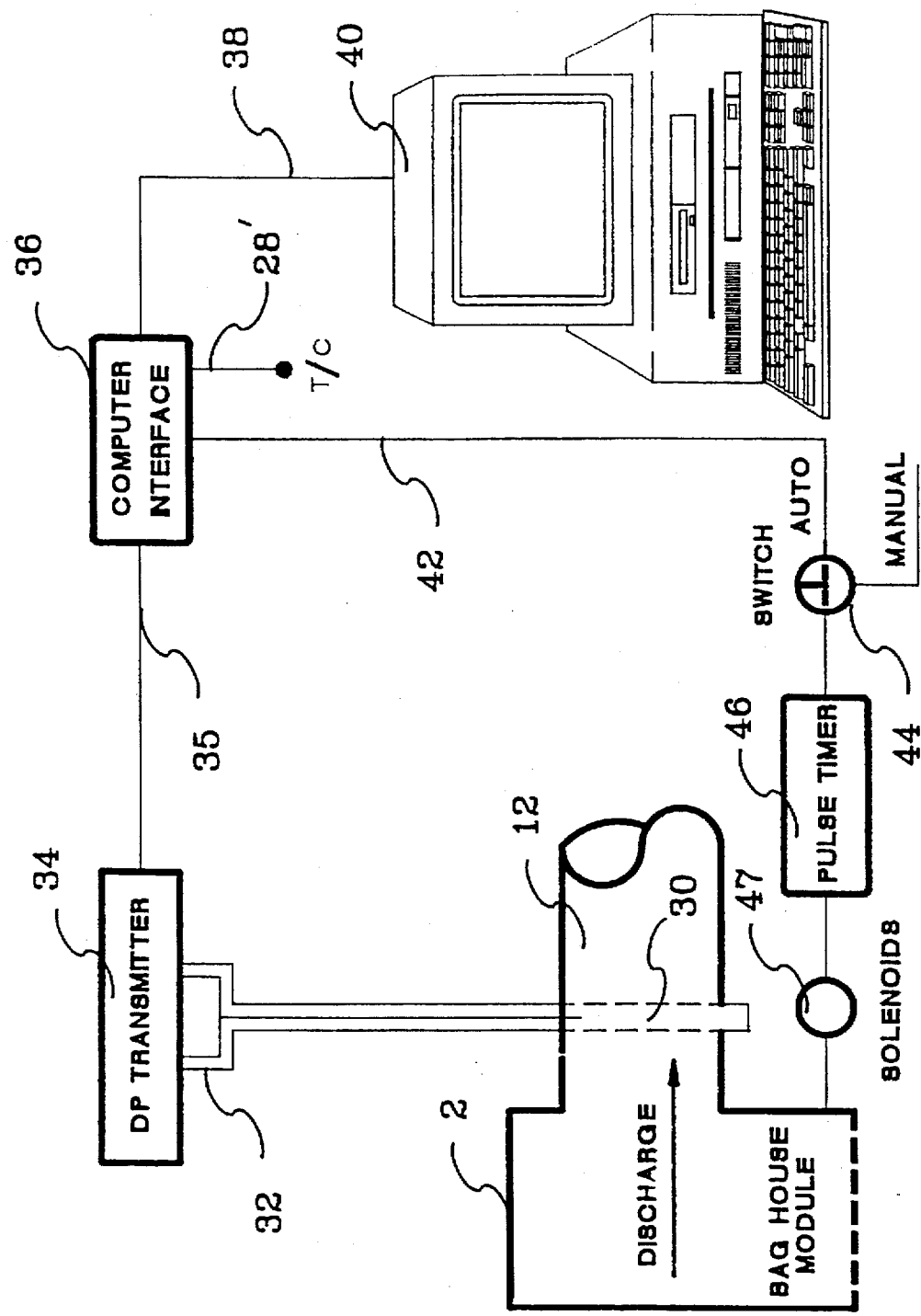
FIG. 2 is a schematic drawing of a baghouse module showing the present invention in place thereon.

A set point is also established using a volumetric flow rate for a clean set of filters in the baghouse at a gas temperature of 70° F. As shown in FIG. 2, a temperature sensor, such as a thermocouple 28, may be positioned in the discharge duct 12 to measure the temperature of the air stream in the duct. More preferably, thermocouple 28 is placed at a location 28' in the common inlet duct 9 of FIG. 1 in order to obtain a more representative air stream temperature for the entire baghouse system. This temperature data is continuously conveyed to the computer 40. The density factor d of equation (1) can then be calculated using the following equation:

$$d = \frac{530}{460 + t} \times \frac{B}{29.92} \text{ (for dry air)} \quad (6)$$

where:

B=barometric pressure, Hg t=air temperature, F.

Ignoring barometric pressure changes, an adjusted volumetric flow rate for the set point may be obtained by calculating the density correction factor (l/d):

$$1/d = \frac{460 + t}{530} \quad (7)$$

As will be noted for standard conditions, when t=70° F., the density correction factor (l/d) equals unity. However, since air becomes less dense at higher temperatures, it requires less fan horsepower (amps) to move the same cubic foot of air as it would at a lower temperature when the air is of greater density, and, thus, heavier per unit volume.

An adjusted set point may then be calculated using the equation:

$$\text{Set Point}_{Adj.} = (\text{Set Point}) \times (1/d) \quad (8)$$

or $$\text{Set Point}_{Adj.} = (\text{Set Point}) \times \left( \frac{460 + t}{530} \right) \quad (9)$$

Thus, the adjusted set point is established continuously by multiplying a fixed set point calculated for 70° F. by the density correction factor (l/d). As previously noted, the computer 40 is continuously monitoring the air temperature within the outlet duct 12 by way of the thermocouple 28. This allows the system to continually adjust the set point as the temperature rises and falls and thus keeps the fan amps more constant and provides a more consistent and maximized flow of air through the air cleaning system.

The computer compares the actual calculated volumetric flow rate (from the Pitot tube device 30) once every second against the set point, as adjusted to actual temperature. When the actual volumetric flow rate is below the adjusted set point, the computer sends a signal to a pulse timer 46 which, in turn, causes the solenoids 47 to clean the bag filters in the baghouse module 2 with pulsed jets of compressed air to commence a cleaning cycle. When the actual volumetric air flow rate as measured by device 30 in the duct 12 rises above or equals the adjusted set point, the computer 40 signals the pulse timer 46 to turn off and the cleaning cycle is stopped. The pulsing of the bags by compressed air or by other mechanical means is well-known in the art and need not be explained in any detail.

According to the present invention, the computer 40 also includes a routine which accumulates the total time the baghouse 2 is in a cleaning cycle during each day. The daily clearing time of a module is equivalent to the total time per day that the module is operating at a flow rate below the set point, which data could also be accumulated and plotted, if desired. By accumulating and plotting this daily cleaning time or below set point operating time for each module on an averaged weekly or monthly basis, the data typically exhibits a relatively flat line. After a number of months, a significant "knee" and an upward trend in daily cleaning time occurs which indicates that a module is becoming blinded and the filter bags should be changed out in that particular module.

Figure 3:
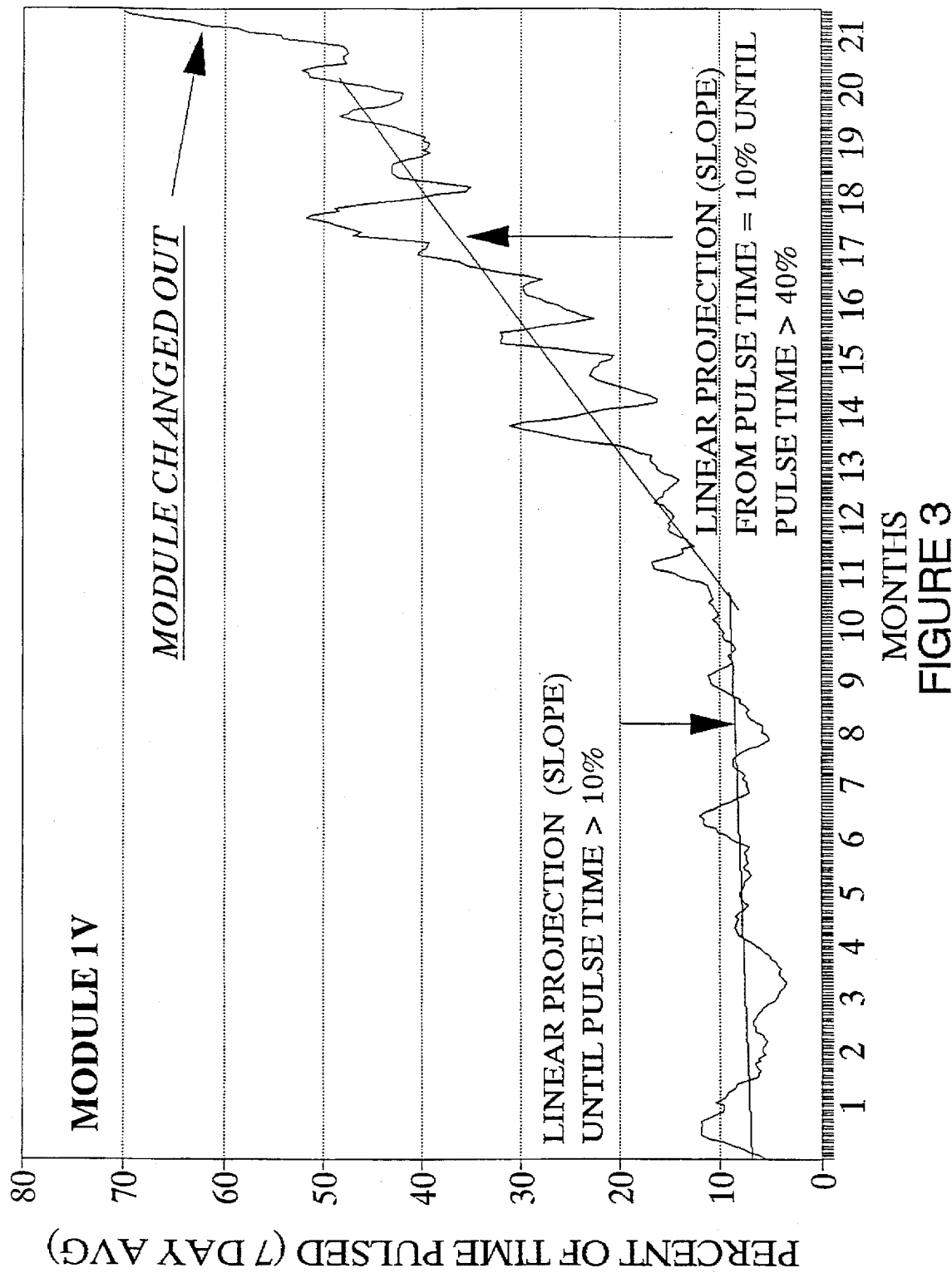
FIG. 3 is a graph showing daily cleaning time versus calendar time for a given baghouse module according to the present invention.

FIG. 3 represents a typical, actual plot of average daily pulse times based on percent of a 24-hour day for Module "1V" a test baghouse operating and controlled according to the invention in conjunction with a dry scrubber system. The average daily pulse times (per week) are plotted over a 22-month period for a set of filter bags that were already 22 months old when the trial began on the Module "1V".

Heretofore, it had been common practice to change out all of the individual falter bags in a baghouse module after about 24 months of operation. FIG. 3 graphically demonstrates that the computer controlled cleaning apparatus and method of the present invention extended the useful life of the filter bags in test Module "1V" by almost two years. The plot of FIG. 3 indicates that the daily pulse time was relatively constant and remained under a 10% daily pulse frequency for a period of about 9 months. For the next 12-month period, the pulse time frequency gradually increased in a linear manner to about a 40% daily cleaning frequency level. In the last or 22nd month of trial operation, the pulse frequency dramatically increased to a 70% level. At that point, the filter bags were changed out in baghouse Module "1V". As previously stated, the filter bags in Module "1V" were already 22 months old when the trial began, hence, the total life of the filter bags at the time of change out was 44 months.

Thus, the control of the pulsed cleaning of the filter bags, when based upon an actual volumetric flow rate from individual baghouse modules results in a dramatic increase in the expected bag life as indicated in FIG. 3. According to the invention, the filter bags are pulsed only when required to maintain the set point air flow. Because of this improved control, based on actual air flow, the excessive pulsing of prior art bag cleaning systems (based on timers or differential pressure drops) is eliminated and a significantly increased bag life is realized. Controlled pulsing also reduces the compressed air requirements which provides savings in the operation of the plant air compressor station.

Figure 4:
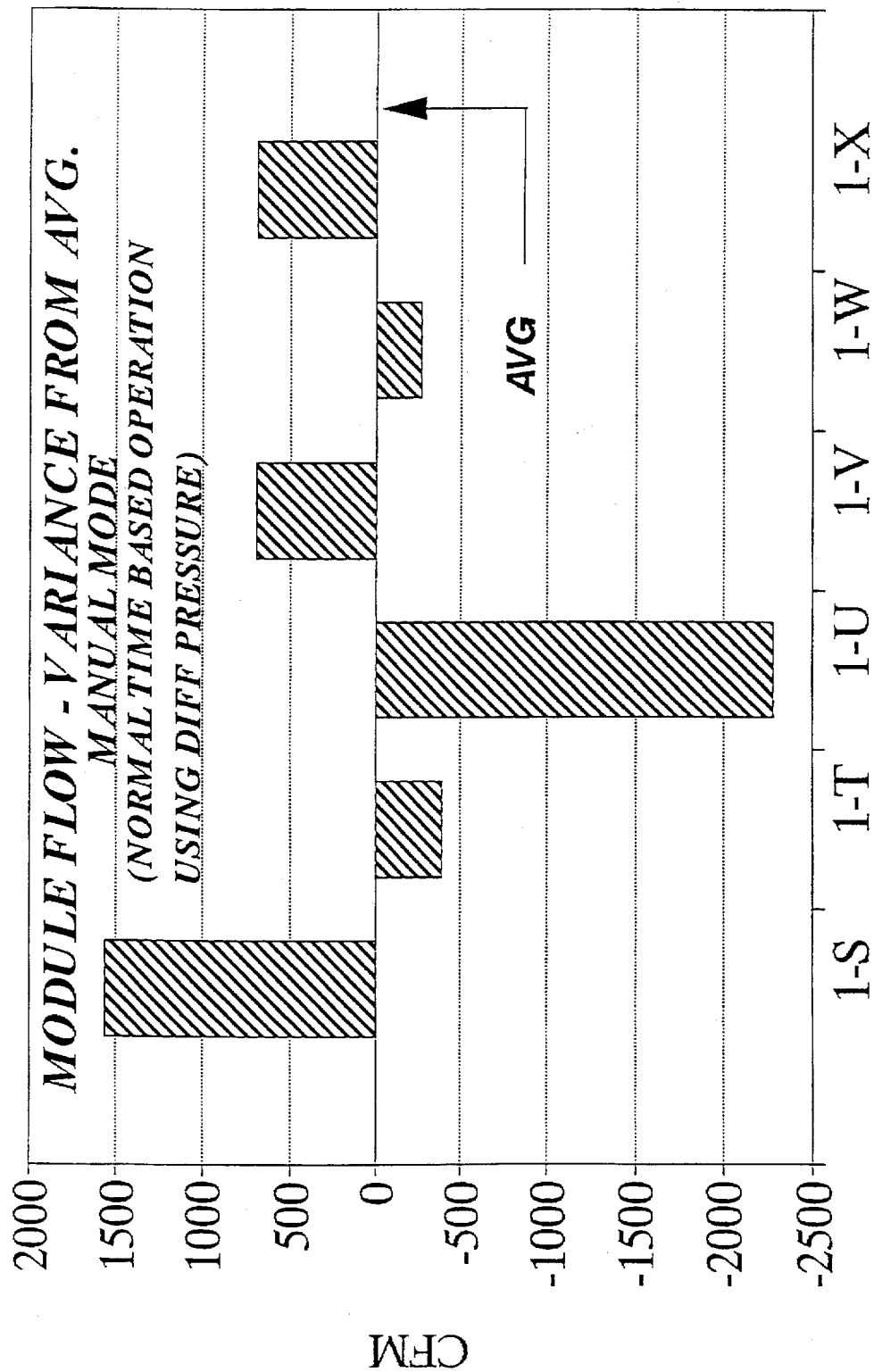
FIG. 4 is a graph showing air flow through a number of baghouse modules using a prior art cleaning method based on differential pressure.
Figure 5:
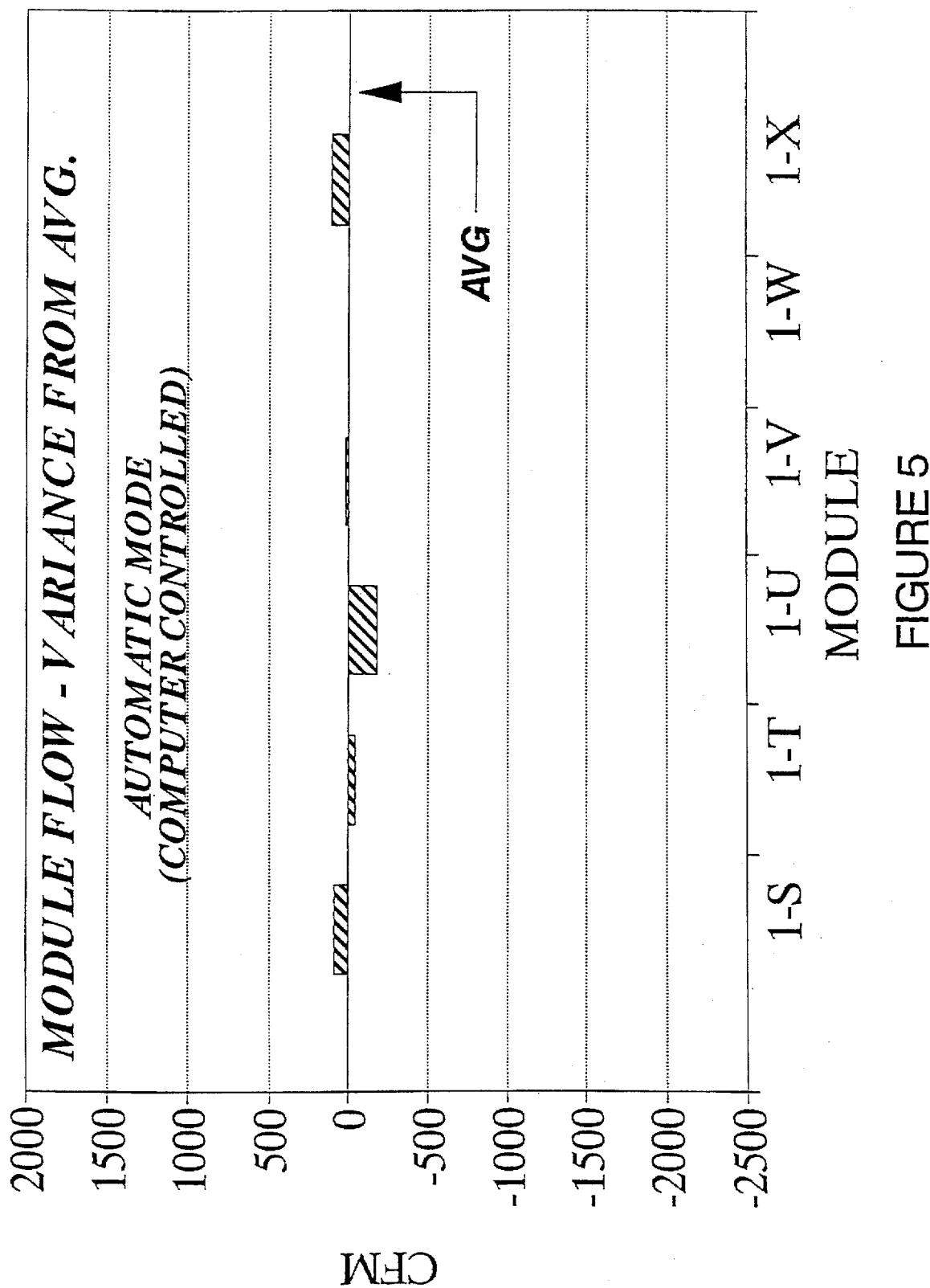
FIG. 5 is a graph similar to FIG. 4 showing air flow through the same baghouse modules while employing the present invention.
Figure 6A:
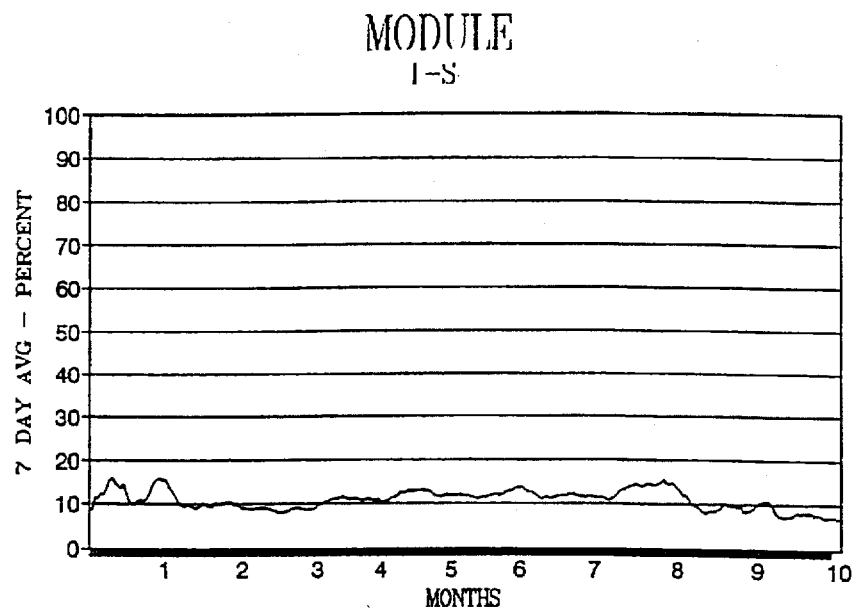
FIGS. 6A to 6F are graphs showing average percent of day cleaning times for six individual baghouse modules over a period of ten months while using the present invention.
Figure 6B:
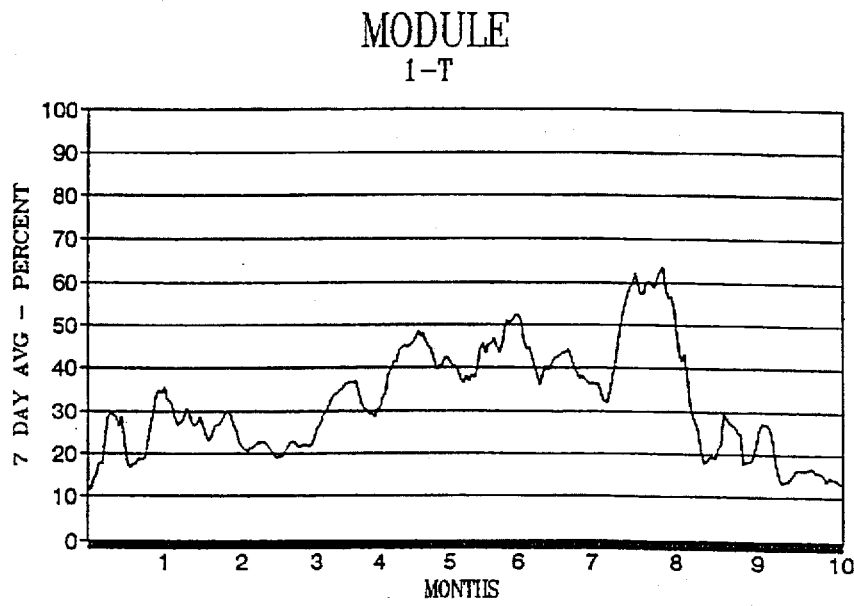
Figure 6C:
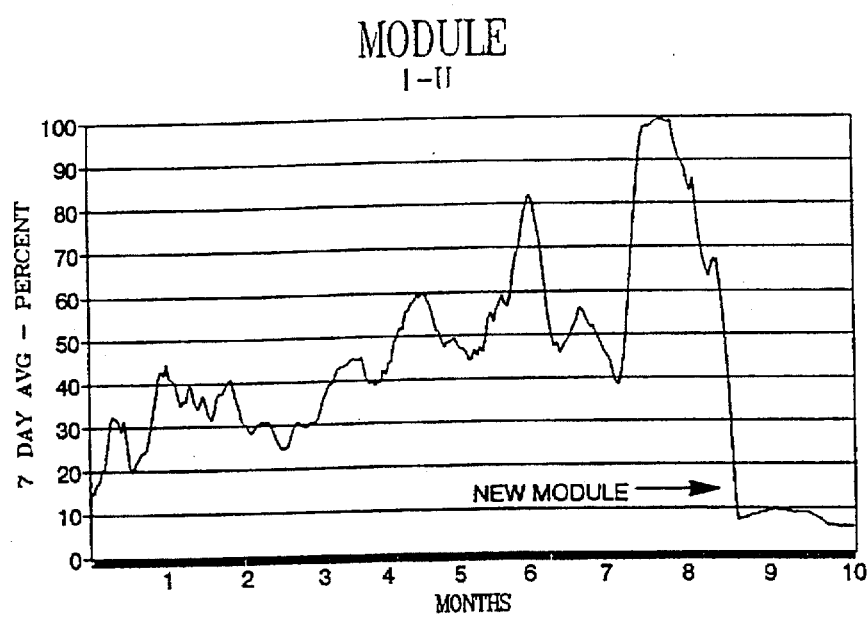
Figure 6D:
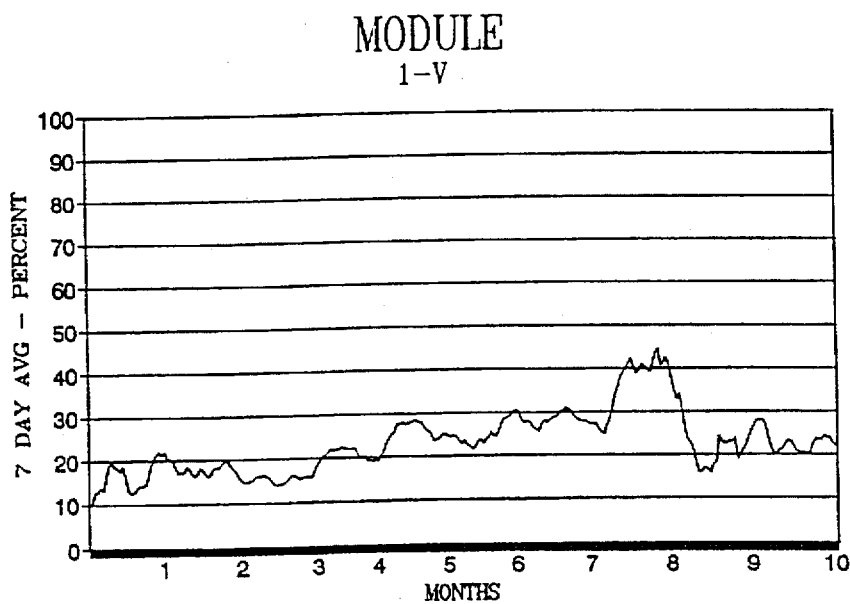
Figure 6E:
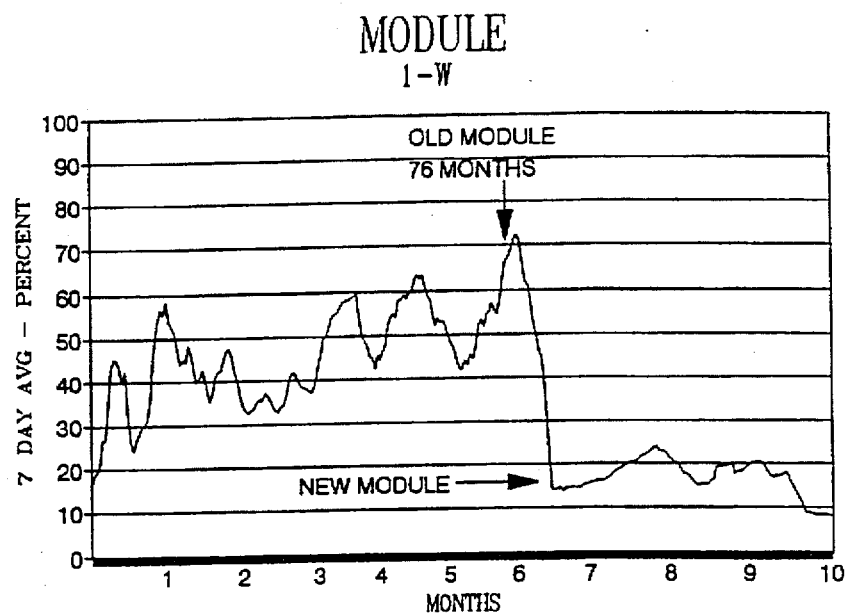
Figure 6F:
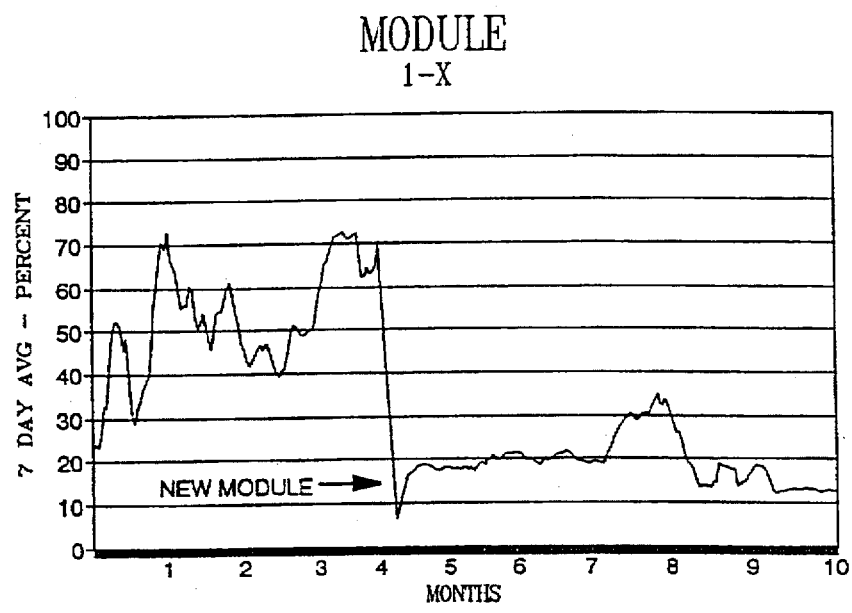

In addition, the controlled pulsing of individual baghouses according to the present invention causes a more equalized flow of air through each baghouse module which, in turn, provides a more equalized particulate loading in each. This feature is exemplified by comparing the graphical representations of FIGS. 4 and 5. The drawings represent the actual air flow variance from an avenge flow rate through six baghouse modules for a one-day operating test period. In FIG. 4, the baghouse modules were pulsed in a manual mode in a normal time based operation using differential pressure across the modules as commonly practiced in the prior art. It will be noted in FIG. 4 that an air flow variance of almost 4000 CFM existed between Module "1-S" and "1-U". Such a variance will result in unequal dust loading in each baghouse. By way of comparison, FIG. 5 shows a more uniform air flow through these same baghouse modules when the pulsed bag cleaning was conducted (over a one-day period) in accordance with the invention using an automatic mode, controlled by the computer 40 and employing actual volumetric air flow rates as sensed by a Pitot tube device 30 located in the outlet duct of each baghouse module tested. The data reported in FIG. 5 indicates that a more uniform gas flow and thus a more equalized dust loading is achieved by the present invention compared with the prior art methods.

FIGS. 6A to 6F represent a trial involving six baghouse modules over a ten-month period. The data reported in FIGS. 6A to 6F were collected using the system's computer 40 and is expressed as the total bag cleaning time based on a % of a 24-hour day taken as a running seven-day average for each data point over this ten-month period. It will be noted that the six baghouses reported in FIGS. 6A to 6F each contained a set of bag filters having a different beginning service life from one another at the commencement of the trial. Some of the baghouses tested in this trial had relatively new bag filters, such as in FIGS. 6A, 6B and 6D, while the balance of the modules tested contained older sets of bag filters.

The graphical data depicted in FIGS. 6A to 6F indicates that the useful life of the filter bags in a baghouse can be accurately predicted when employing the present invention. It will be noted in FIGS. 6C, 6E and 6F, that the end of the useful bag life in Modules "1-U", "1-W" and "1-X" is indicated by the drastic increase in cleaning times which approaches and exceeds the 70% daily cleaning level. After the replacement of the filter bags in Modules "1-U", "1-W" and "1-X", the graphs of FIGS. 6C, 6E and 6F, respectively, show a dramatic decrease in daily cleaning frequencies in each of these modules.

In addition to predicting the end of useful bag life, the graphs of FIG. 6 also demonstrate, to a certain extend, the extended bag life benefits achieved by the present invention. Module "1-S" of FIG. 6A had an age of 27.6 months at the graph end point, while possessing extremely low cleaning frequencies of less than 10%. Such a running history portends a long life expectancy for the filter bags in Module "1-S". Module "1-V" of FIG. 6D had an age of 41.0 months at the graph end point and required cleaning at only a 20–30% frequency at that age which, likewise, indicates that a long bag life will be obtained. Module "1-W" of FIG. 6E required charge out, but only after the replaced set of bags performed for a total period of 76 months, which is far in excess of the typical prior art bag life expectancy.

As previously discussed, the ability to measure actual air stream temperatures in the system and to adjust the set point based on the density correction factor, is quite beneficial to the overall operation of the system. As alluded to above, the temperature/air density correction of the set point of each baghouse creates a more uniform and maximized air flow/draft through the system. This provides several important operating benefits. The fans 20 receive a consistent load at all temperatures which maximizes the efficiency of the fans and eliminates the need to make manual adjustments of the fan dampers which heretofore has been required to prevent fan motor overloading. The temperature/air density correction of the set point, by maximizing the draft at a consistent level over a 24-hour operating period, also increases the capture of emissions at the hooding structure surrounding the source. Due to the increased and more consistent draft, less emissions escape capture at the dust collection hoods so as to minimize unwanted venting of pollutants to the atmosphere.

While specific embodiments of the invention have been described in detail, it will be appreciated by those skilled in the art that various modifications and alternatives to those details could be developed in light of the overall teachings of the disclosure. The presently preferred embodiments described herein are meant to be illustrative only and not limiting as to the scope of the invention which is to be given the full breadth of the appended claims and any and all equivalents thereof.

I claim:

1. Apparatus for cleaning filter elements in a plurality of parallel ducted modules wherein each module contains a plurality of filter elements, each of said modules having pulse means to dislodge accumulated particulate matter from the filter elements when said means is activated, said apparatus comprising:

means for measuring an impact pressure and a static pressure of a gas stream flowing from each module;

means for transmitting said impact pressure and static pressure measurements to a computer means for calculating an actual volumetric flow rate of gas flowing from each module and for comparing said actual volumetric flow rate with a flow rate set point; and means for signaling the pulse means of each module to activate said pulse means for a given module when the calculated flow rate for the given module is below said set point and for deactivating said pulse means when said calculated flow rate for the given module is at least equal to said set point.

2. The apparatus of claim 1 wherein the means for measuring the impact pressure and the static pressure is an averaging double tube Pitot tube.

3. The apparatus of claim 1 wherein the computer means accumulates a total time the pulse means is in an activated mode for each module on a daily basis, and means for graphically displaying said daily total time, whereby, a useful bag life for each module may be predicted when said graphical display exceeds a critical level.

4. The apparatus of claim 1 including means for measuring a temperature of the gas stream whereby a density correction factor may be calculated for said gas stream by said computer means to provide a corrected flow rate set point for comparing with said actual volumetric flow rate.

5. Apparatus for cleaning bag filters in a plurality of parallel ducted baghouses and for predicting a useful life thereof, comprising:

means for determining an actual volumetric flow rate of a gas stream discharged from each of the baghouses;

means for sensing a temperature of the gas stream;

means for selectively cleaning the bag filters in each baghouse;

means for determining an adjusted flow rate set point based on a density factor correction in accordance with the sensed temperature and for comparing the determined volumetric flow rate for each baghouse and the adjusted flow rate set point, wherein when the actual volumetric flow rate for a given baghouse is below the adjusted set point, said cleaning means is activated for the given baghouse and when the actual volumetric flow rate is at least equal to said set point, said cleaning means is deactivated; and means for accumulating a total daily time said cleaning means is in an activated condition for each baghouse, including means for graphically displaying said total daily times for each baghouse, whereby, an end of the useful life of the bags in each baghouse may be predicted.

6. The apparatus of claim 5 wherein said cleaning means is one selected from the group consisting of a pulsed compressed air system, a mechanical shaker system, and a mechanical rapper system.

7. The apparatus of claim 5 wherein said means for determining the actual volumetric flow rate comprises an averaging double tube Pitot tube for measuring an impact pressure and a static pressure in the gas stream discharged from the baghouse and further includes computer means for calculating the volumetric flow rate of said gas stream based on said impact and static pressure measurements, said computer means also functioning as said means for determining the adjusted flow rate set point, for comparing said volumetric flow rate and said adjusted set point, for activating and deactivating said cleaning means and for accumulating the total daily time the cleaning means is in an activated condition.

8. The apparatus of claim 7 wherein the cleaning means is a pulsed compressed air system.

9. A method for cleaning filter elements in a plurality of parallel ducted modules housing a plurality of filter elements, each of said modules having cleaning means to dislodge accumulated particulate matter from the filter elements when the cleaning means is selectively activated, the method comprising the steps of:

a) measuring an impact pressure and a static pressure in a gas stream being discharged from each module;

b) calculating an actual volumetric flow rate of said gas stream from each module;

c) measuring a temperature of said gas stream and calculating a density factor for said gas stream based on said measured temperature;

d) calculating an adjusted flow rate set point based upon said density factor;

e) comparing said actual volumetric flow rate from each module and said adjusted set point;

f) activating the cleaning means for a given module when the actual volumetric flow rate is less than the adjusted set point for said given module; and g) deactivating the cleaning means when the volumetric flow rate for the given module is at least equal to the adjusted set point.

10. The method of claim 9 further including the steps of:

accumulating a total daily time said cleaning means is in an activated condition for each module; and predicting an end of the useful life of the filter elements in each module when the accumulated daily cleaning time for each module exceeds a predetermined level.

11. The method of claim 10 wherein said predetermined critical level is about 70% of a 24-hour daily operating period.

12. The method of claim 9 wherein the cleaning means is one selected from the group consisting of a pulsed compressed air system, a mechanical shaker system and a mechanical rapper system.

13. A method of cleaning filter bags and for predicting the useful life of such filter bags in a plurality of parallel ducted baghouses, each of said baghouses having pulse means for selectively delivering bursts of compressed air to clean particulate matter from the filter bags, the method comprising the steps of:

a) measuring an impact pressure and a static pressure in a gas stream being discharged from each baghouse;

b) calculating a volumetric flow rate of said gas stream;

c) measuring a temperature of said gas stream and a density factor for said gas stream based on said measured temperature;

d) calculating an adjusted flow rate set point based upon said density factor;

e) comparing said volumetric flow rate and said adjusted set point;

f) activating the cleaning means when the volumetric flow rate is less than the adjusted set point;

g) deactivating the cleaning means when the volumetric flow rate is at least equal to the adjusted set point;

h) accumulating a total daily time said cleaning means is in an activated mode for each baghouse; and i) predicting an end of the useful life of the filter bags in each baghouse when an accumulated daily cleaning time exceeds a predetermined level.

14. The method of claim 13 including the step of visually displaying the accumulated daily cleaning time for each baghouse in a graphical form for use in said predicting step.

15. The method of claim 14 including the step of averaging said accumulated daily cleaning times on a weekly basis for use in said visually displayed graph.

* * * * *

UNITED STATES PATENT AND TRADEMARK OFFICE
CERTIFICATE OF CORRECTION

PATENT NO. : 5,711,785
DATED : January 27, 1998
INVENTOR(S) : Allan L. Maxwell

It is certified that error appears in the above-identified patent and that said Letters Patent is hereby corrected as shown below:

```
Column 7 Line 7 after equation (1) and before "where air is"
insert --where: C = constant = 1096
                VP = Velocity Pressure
                d = density factor --.

Column 7 Line 13, after equation (2) and before "Hence"
insert --where: VP = (IP - SP)
                IP = Impact Pressure
                SP = Static Pressure--.

Column 8 Line 49 "falter bags" should read --filter bags--.

Column 9 Line 17 "avenge" should read --average--.
```

Signed and Sealed this

Second Day of June, 1998

*Attest:*

*Attesting Officer*

BRUCE LEHMAN

*Commissioner of Patents and Trademarks*